H. A. KRICKE.
AUTOMATIC SHUT-OFF VALVE FOR VACUUM ON MILKING APPARATUS.
APPLICATION FILED MAR. 25, 1915.
1,183,080. Patented May 16, 1916.
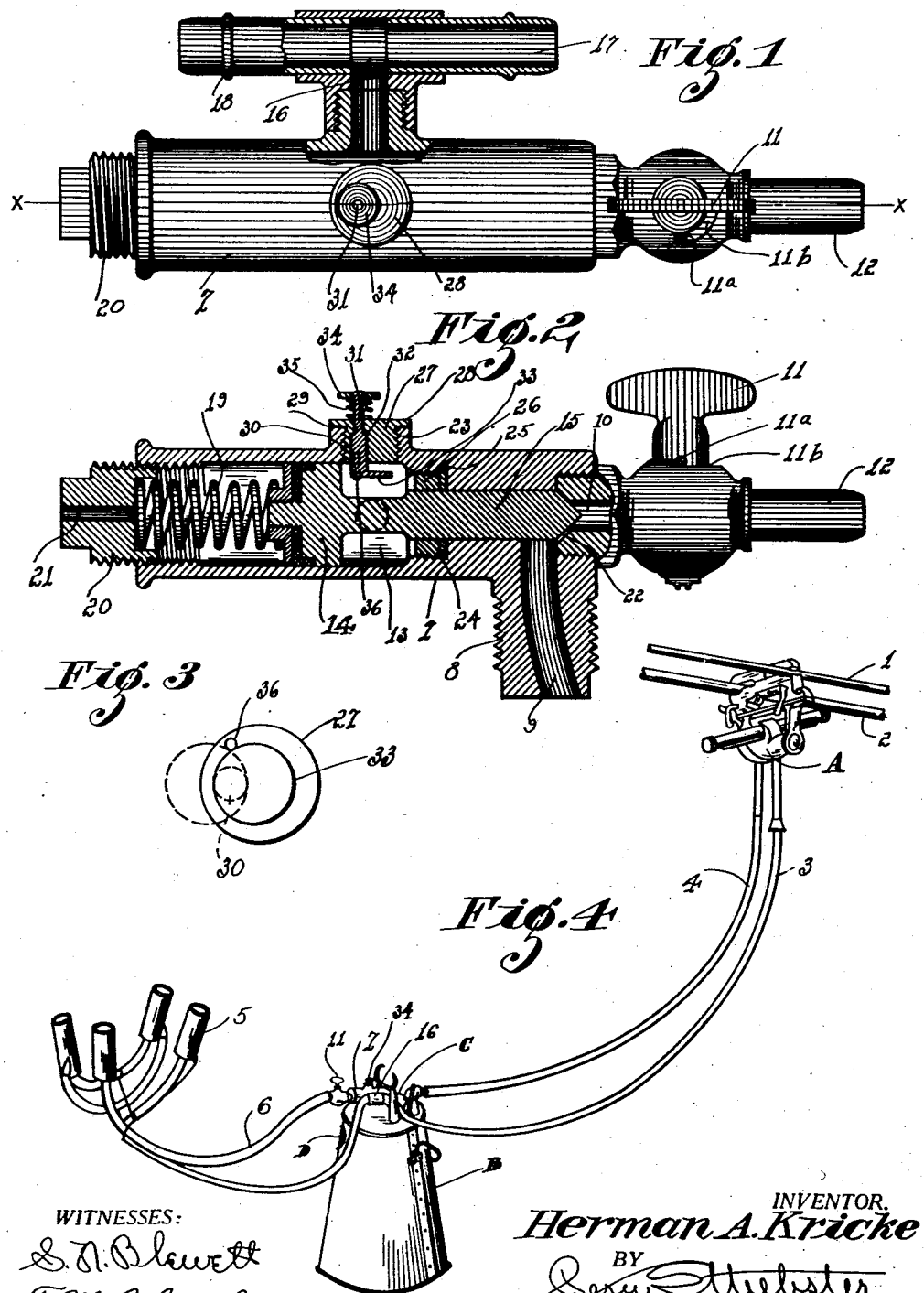
WITNESSES:
S. N. Blewett
F. M. Blanchard
INVENTOR.
Herman A. Kricke
BY
Jerry Webster
ATTORNEY

UNITED STATES PATENT OFFICE.

HERMAN A. KRICKE, OF CROWS LANDING, CALIFORNIA.

AUTOMATIC SHUT-OFF VALVE FOR VACUUM ON MILKING APPARATUS.

1,183,080. Specification of Letters Patent. Patented May 16, 1916.

Application filed March 25, 1915. Serial No. 16,877.

*To all whom it may concern:*

Be it known that I, HERMAN A. KRICKE, a citizen of the United States, residing at Crows Landing, in the county of Stanislaus and State of California, have invented certain new and useful Improvements in Automatic Shut-Off Valves for Vacuum on Milking Apparatus; and I do declare the following to be a clear, full, and exact description of the same, reference being had to the accompanying drawings, and to the characters of reference marked thereon, which form a part of this application.

This invention relates to improvements in milking apparatus and particularly to that type of mechanical milking apparatus commonly known as the pulsating pressure and vacuum type in which the teat cups are operated by pulsating pressure and the milk withdrawn by vacuum suction maintained in the milk receiving receptacle, an example of said type being shown in the patent to Sharples, #1,014,671, Jan. 16th, 1912.

My improved structure embodies an automatic control valve adapted to control the suction from the teat cups into the receptacle. With the action of the device described in the above mentioned patent, although a pulsating action of the suction is obtained through the pulsator, the effect of this action is lost due to the fact that after a vacuum is once established in the milk receiving receptacle, this maintains a constant suction from the teat cups which causes an undue suction on the milk ducts with consequent stricture thereof tending to develop a swelling and irritation of the udder of the animal.

My improved invention therefore is to overcome this constant suction and apply it only at the time of the squeezing of the teat cups for the purpose of drawing off the milk as it is squeezed from the milk duct thus performing the functions of the device in any efficient manner without injury to the animal in any degree.

The invention further provides a manually operated means for temporarily rendering inoperative the automatic control of the suction, as stated above.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a plan view of my improved shut-off valve partly broken out and in section. Fig. 2 is a side elevation mostly in section of the shut-off valve. Fig. 3 is a bottom plan view of the manually controlled mechanism. Fig. 4 is a perspective view of the complete milking apparatus showing the application of my device thereto.

As has been pointed out above, I, in this application, make no specific claim to the structure of the milking apparatus itself, hence will not at this time enter into any particular detailed description of the structure and operation of the milking apparatus as a whole but merely refer to the same briefly in order that the application of my improved structure thereto may be clearly understood.

Referring now more particularly to the characters of reference on the drawings with particular reference to Fig. 4, the numeral 1 designates the pressure or lead pipe connected with the pulsator "A", while the numeral 2 designates the suction lead pipe connected with the said pulsator "A". The numeral 3 designates the pressure pipe leading from the pulsator "A" to the teat cups 5. The numeral 4 designates the suction pipe communicating from the milk receiving receptacle "B" to the pulsator "A" and the numeral 6 designates the suction pipe leading from the teat cups 5 to the receptacle "B". This pulsator structure is the same as described in the patent mentioned in the preamble to this specification, hence I do not enter into a detailed description of the same in this specification, as it is a well-known and commonly used type. My improved structure is interposed between the pipe 6 and the receptacle "B" and is automatically controlled by the pressure passing through the pipe 3 in order to allow the suction of the vacuum in the receptacle "B" to operate through the pipe 6 whenever the pressure is applied through the pipe 3 to the teat cups 5 to cause said teat cups to squeeze the milk from the milk ducts. This operation is carried on and controlled by means of the following structure and operation, namely: The valve proper comprises a casing 7 provided with a centrally orificed nipple 8 adapted to screw into the cover "C" of the receptacle "E", the orifice 9 of the nipple 8 communicating with a passageway 10 in the body of the casing 7, which passageway is controlled by a valve 11 having a nipple 12 to which is secured the pipe 6 in any suitable manner. The said casing 7 is provided with a cylindrical chamber 13 movable in which is a suitable piston 14 having a projecting stem 15 slidable through the body of the casing 7 and forming a normal closure between the passageway 9 and the passageway 10 to shut off the suction of the vacuum created in the receptacle "B" when the pressure is not passing through the pipe 3 with the operation of the pulsator "A". This normal closed position is maintained by the suction of such vacuum in the receptacle "A" operating to pull the stem 15 to closed position. Whenever the pressure passes through the pipe 3 to operate the teat cups to squeeze the milk from the milk ducts, this automatically draws the stem 15 away from the passageways 9 and 10 to open communication between the same to allow of the milk being sucked into the receptacle "B" and this operation is permitted of by reason of the following structure, namely: Communicating with the chamber 13 is a T-coupling 16 having nipples 17 and 18, the pipe 3 being cut and each part connected with one of these couplings so that when the pressure passes through the pipe 3 it will likewise pass into the chamber 13. Thus when the pressure passes through the pipe 3 to operate the teat cups, it simultaneously moves the piston 14 in the chamber 13 and draws the stem 15 away from closed position between the passageways 9 and 10. Thus simultaneously with the squeezing of the teat cups, the suction caused by the vacuum in the receptacle "B" draws the milk so squeezed from the milk ducts back into the receptacle. Then with the operation of the pulsator, the pressure in the pipe 3 ceases, likewise withdrawing the pressure from the chamber 13 and the action of the suction in the receptacle "B" then draws the stem 15 to closed position again. This return of the stem 15 is also aided by means of an expansive spring 19 disposed in an adjustable plug 20 screwed into the end of the casing 7 and against which the piston 14 impinges when actuated by the pressure as above described. As said piston moves against said spring 19, it contracts the same and when said pressure is reduced, the sudden expansion of the spring tends to throw the piston forward to cause the stem 15 to move to closed position. The position of the plug 20 may be changed to vary the tension of the spring 19 and said plug 20 is also provided with a hole 21 to allow of the escape of the compressed air caused by the movement of the piston 14 toward said plug 20.

While I have set forth above that the suction through the pipe 6 is closed by the stem 15, I mean by this that the greater portion of the suction is so shut off to prevent the drawing of any substantial portion of the milk at any other time than during the squeezing operation, but I maintain a slight suction by means of a small bleed port 22 leading from the passageway 9 to the passageway 10 when the stem 15 is in closed position. I maintain a tight joint between the chamber 13 and the passageways 9 and 10 by means of a washer 24 interposed in a recess 25 formed in the casing 7, said washer fitting closely around the stem 15 and being held in such position by means of a screw plug 26 screwed into said recess 25. The valve 11 is used to positively open and shut communication from the receptacle "B" to the pipe 6 and its full open and closed positions are determined by a small lug 11$^a$ movable against shoulders 11$^b$ which limit the movement of the said valve 11.

There is one point which I wish to especially call attention to with respect to the milk closing valve and that is the fact that the desired result to be obtained is to cause the suction on the teats of the cow to cease the instant the squeezing operation of the teat cups ceases and this is accomplished in my improved structure by reason of the fact that the vacuum in the receptacle "B" is always present and hence is always tending to draw against the stem 15. Thus the instant the pressure medium is released from the pipe 3 and consequently from against the piston 14, this vacuum suction instantly draws the stem 15 to closed position in a much quicker manner than the pressure is released so that the suction against the teats ceases with the release of the pressure medium in the pipe 3.

The passageway 9 through the nipple 8 is curved as shown so as to deliver the milk against an indicating glass "D" formed in the side of the receptacle "B" so that the operator may see at all times whether the milk is being delivered. When fitting teat cups on the animal or when removing the cover from the bucket, these two operations are rendered much easier by temporarily rendering inoperative the automatic control valve which shuts off communication between the suction line from the teat cups and the bucket and this is accomplished by means of the following manually operated attachment, namely: In the upper side of the casing 7, I provide a threaded orifice 23 into which is normally threaded a block 27 having a projecting flange 28 which fits closely over the top of the member 23, there being a gasket 29 interposed between the flange 28 and the member 23. Disposed eccentrically through the member 27 is a pin 30 having a reduced portion 31 projecting through the upper end of the member 27, there being suitable packing 32 interposed between the shoulder formed by this reduced portion and the member 27 in order to make a tight joint. The member 27 projects within the casing 7 between the piston 14 and the member 26 where it is provided with an eccentric cam 33 engageable with the member 14 as the pin 30 is turned. This turning movement of the pin 30 is accomplished by a knurled thumb screw 34 mounted on the outer end of the portion 31 to the pin 30. A spring 35 is interposed between the member 27 and the member 34 in order to hold the pin 37 in position against the packing 32. When it is desired, as noted above, to temporarily open the valve 15 to render it inoperative, the operator turns the member 34 which actuates the cam 33 against the piston 14 moving and holding the valve 15 away from its normal closed position. After the teat cups have been adjusted or the cover removed, as may be desired, the cam 33 may be again returned to neutral position as shown in Fig. 2 when the valve will again automatically perform its function, as noted. A pin 36 is disposed in the inner face of the member 27 to act as a stop to regulate the turning movement of the cam 33 so it cannot turn so far as to render its function useless.

From the foregoing description it will readily be seen that I automatically control the suction from the teat cups into the receptacle "B" to apply the same only when desired so as to overcome the deleterious results enumerated in the preamble to the specification. It is further to be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claims.

Having thus described my invention what I claim as new and useful and desire to secure by Letters Patent is:—

1. The combination with a milking apparatus having a milk receiving receptacle and teat cups, with a pressure pipe communicating with said teat cups and a suction pipe leading from said teat cups to said receptacle, and means for creating a vacuum in said receptacle, of a means for controlling the suction from said receptacle through said pipe leading from said teat cups, such means being controlled by the pressure medium moving through said pressure pipe, as described.

2. A device of the character described comprising the combination of a receptacle, teat cups, a pulsator, a pressure pipe leading from said pulsator to said teat cups, a suction pipe leading from said pulsator to said receptacle, whereby a constant suction will be effected in said receptacle, a suction pipe leading from said teat cups to said receptacle, and a control valve interposed between said last named suction pipe and said receptacle and being operatively connected with said pressure pipe whereby communication will be open between said last named suction pipe and said receptacle only when a pressure medium passes through said pressure pipe, as described.

3. In a device of the character described, a control valve comprising a casing having a passageway, a piston movable in said casing and having a stem forming a normal closure for said passageway, means for applying a pressure medium against said piston to cause said stem to open said passageway, said stem being adapted to be drawn by suction in said passageway to close the passageway, as described.

4. In a device of the character described comprising the combination of a receptacle, teat cups, a pulsator, a pressure pipe leading from said pulsator to said teat cups, a suction pipe leading from said receptacle to said pulsator, whereby a constant suction will be effected in said receptacle, a suction pipe leading from said teat cups to said receptacle, and a control valve interposed between said last named suction pipe and said receptacle, said control valve comprising a casing, a piston movable in said casing and adapted to be controlled by the pressure medium passing through said pressure pipe, a stem on said piston forming a normal closure between said last suction pipe and said receptacle when said pressure medium is not present in said pressure pipe and adapted to open communication when said pressure medium is present in said pressure pipe and operating said piston, as described.

5. A valve for the purpose described having a passageway and a chamber, a piston movable in said chamber and provided with a stem adapted to be drawn by suction in said passageway to close said passageway, means for connecting a pressure medium to said chamber to operate said piston to cause said stem to open said passageway in combination with means for alternately applying and relieving said pressure medium whereby said passageway will be alternately opened and closed, as described.

6. The combination with a milking apparatus having a milk receiving receptacle and teat cups, and a suction pipe leading from said teat cups to said receptacle, and means for creating a vacuum in said receptacle, of a means for controlling the suction from said receptacle through said pipe leading from said teat cups, and means for temporarily rendering inoperative such controlling means 7. The combination with a milking apparatus having a milk receiving receptacle and teat cups, a pressure pipe leading to said teat cups and a suction pipe leading from said teat cups to said receptacle, and means for creating a vacuum in said receptacle, of a means for controlling the suction from said receptacle through said pipe leading from said teat cups, such means comprising a piston control valve operable by the pressure medium moving through said pressure pipe, and means for temporarily rendering said valve inoperative, such means comprising a movable cam engageable with said piston to move and hold such valve to in an inoperative position, as described.

8. In a device of the character described, the combination of a receptacle, teat cups, a suction pipe leading from said teat cups to said receptacle, means for effecting a constant suction in said receptacle, a shut-off valve in said first named pipe, the same being normally held in closed position by the suction in said receptacle, and independent means for operating said valve, as described.

In witness whereof, I affix my signature.

HERMAN A. KRICKE.